(12) United States Patent
Collinge et al.

(10) Patent No.: US 11,263,626 B2
(45) Date of Patent: Mar. 1, 2022

(54) METHOD AND SYSTEM FOR GENERATING CRYPTOGRAMS FOR VALIDATION IN A WEBSERVICE ENVIRONMENT

(71) Applicant: MASTERCARD INTERNATIONAL INCORPORATED, Purchase, NY (US)

(72) Inventors: Mehdi Collinge, Mont-Sainte-Aldegonde (BE); Patrik Smets, Nijlen (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 36 days.

(21) Appl. No.: 16/299,342

(22) Filed: Mar. 12, 2019

(65) Prior Publication Data

US 2019/0213588 A1  Jul. 11, 2019

Related U.S. Application Data

(63) Continuation of application No. 14/919,265, filed on Oct. 21, 2015, now Pat. No. 10,275,767.
(Continued)

(51) Int. Cl.
*G06Q 20/00* (2012.01)
*G06Q 20/38* (2012.01)
*H04L 29/06* (2006.01)

(52) U.S. Cl.
CPC ........ *G06Q 20/3829* (2013.01); *G06Q 20/00* (2013.01); *G06Q 20/382* (2013.01); *G06Q 20/3823* (2013.01); *H04L 63/083* (2013.01); *H04L 63/062* (2013.01); *H04L 2463/061* (2013.01)

(58) Field of Classification Search
CPC .......... G06Q 2220/00; G06Q 2220/10; G06Q 2220/16
See application file for complete search history.

(56) References Cited

U.S. PATENT DOCUMENTS 7,096,494 B1  8/2006  Chen
9,842,335 B2  12/2017  Hayhow et al.
(Continued)

*Primary Examiner* — Dante Ravetti
(74) *Attorney, Agent, or Firm* — Buchanan Ingersoll & Rooney PC

(57) ABSTRACT

A method for generating cryptograms in a webservice environment includes: receiving, in a first environment of a computing system, a credential request transmitted by an external computing device using a secure communication protocol, the credential request including a transaction identifier and account identifier; transmitting, by the first environment, a data request to a second environment of the computing system, the data request including the account identifier; receiving, by the first environment, an account profile and session key from the second environment; transmitting, by the first environment, a cryptogram request to a third environment of the computing system, the cryptogram request including the account profile and session key; receiving, by the first environment, a cryptogram from the third environment generated using the account profile and session key; and transmitting, by the first environment, the cryptogram and transaction identifier to the external computing device via the secure communication protocol.

8 Claims, 7 Drawing Sheets

Related U.S. Application Data

(60) Provisional application No. 62/066,553, filed on Oct. 21, 2014.

(56) References Cited

U.S. PATENT DOCUMENTS

| | | | | |
|---|---|---|---|---|
| 2009/0055642 A1* | 2/2009 | Myers | ............... | H04L 9/3226 |
| | | | | 713/155 |
| 2013/0211929 A1* | 8/2013 | Itwaru | ............... | G06Q 20/352 |
| | | | | 705/16 |
| 2015/0154596 A1* | 6/2015 | Collinge | ........... | G06Q 20/3829 |
| | | | | 705/71 |

* cited by examiner

METHOD AND SYSTEM FOR GENERATING CRYPTOGRAMS FOR VALIDATION IN A WEBSERVICE ENVIRONMENT

FIELD

The present disclosure relates to the generation of cryptograms in a webservice environment, specifically the use of multiple computing environments to facilitate the generation of cryptograms in a computing environment outside of a consumer computing device.

BACKGROUND

As technology improves, consumers have begun to use computing devices during the conducting of payment transactions on a more frequent basis. Traditionally, computing devices have been used to convey payment details to a merchant as part of a payment transaction directly, by having the consumer input their transaction account number and other data, which gets electronically transmitted to the merchant point of sale system. In some instances, the merchant point of sale system may be responsible for generating any cryptograms and other data necessary for use in the processing of the payment details during the payment transaction process. In other instances, the consumer's computing device may be configured, such as via an electronic wallet application program, to generate cryptograms and other data that is conveyed to the merchant point of sale system along with the transaction account number and other necessary information.

However, payment information stored locally in a consumer computing device may be vulnerable to theft or may otherwise be compromised by a nefarious party. For example, the computing device may be hacked into and the payment information copied or stolen, or the computing device itself may be stolen, which may result in fraudulent transactions being conducted using the consumer's payment information. As a result, many consumers may be uncomfortable with electronic payment transactions using computing devices where the payment information is transmitted from the computing device at the time of the transaction.

In an effort to encourage consumer participation in the use of computing devices in electronic payment transactions, referred to herein as "remote" payment transactions or "e-commerce" payment transactions, some merchants utilize systems whereby consumer payment information is retained for future use. In such systems, a consumer can identify themselves using their computing device, such as via username and password authentication, and may indicate to the merchant to utilize payment information that was previously provided. The merchant can then initiate the transaction using the stored information, negating the need for the consumer to electronically transmit the information from their computing device, which may reduce the likelihood of the information being compromised.

However, merchant systems themselves may also be vulnerable to hacking and other nefarious activity whereby the consumer's payment information may be compromised. As such, many consumers may be uncomfortable having a merchant retain their payment information. Thus, there is a need for a technical solution whereby payment information may be retained and necessary cryptograms generated for a payment transaction that utilizes a secure computing environment outside of consumer and merchant systems such that the payment information is stored securely and still easily accessible for a consumer to use in a payment transaction.

SUMMARY

The present disclosure provides a description of systems and methods for generating cryptograms in a webservice environment.

A method for generating cryptograms in a webservice environment includes: receiving, by a receiving device in a first environment of a computing system, a data signal superimposed with a credential request transmitted by an external computing device, wherein the credential request includes at least a transaction identifier and an account identifier and wherein the data signal is transmitted via a secure communication protocol; transmitting, by a transmitting device in the first environment of the computing system, a data request to a second environment of the computing system, wherein the data request includes at least the account identifier; receiving, by the receiving device in the first environment of the computing system, at least an account profile and a session key from the second environment of the computing system; transmitting, by the transmitting device in the first environment of the computing system, a cryptogram request to a third environment of the computing system, wherein the cryptogram request includes at least the account profile and one of: the session key or a secondary key derived from the session key; receiving, by the receiving device in the first environment of the computing system, a cryptogram from the third environment of the computing system, wherein the third environment of the computing system is configured to generate the cryptogram using at least the account profile and the session key or the secondary key; and transmitting, by the transmitting device the first environment of the computing system, a data signal superimposed with credential data to the external computing device, wherein the credential data includes at least the cryptogram and the transaction identifier and wherein the data signal is transmitted via the secure communication protocol.

A system for generating cryptograms in a webservice environment includes a computing system having first, second, and third environments. A receiving device in the first environment of the computing system is configured to receive a data signal superimposed with a credential request transmitted by an external computing device, wherein the credential request includes at least a transaction identifier and an account identifier and wherein the data signal is transmitted via a secure communication protocol. A transmitting device in the first environment of the computing system is configured to transmit a data request to a second environment of the computing system, wherein the data request includes at least the account identifier. The receiving device of the first environment of the computing system is further configured to receive at least an account profile and a session key from the second environment of the computing system. The transmitting device of the first environment of the computing system is further configured to transmit a cryptogram request to a third environment of the computing system, wherein the cryptogram request includes at least the account profile and one of: the session key or a secondary key derived from the session key. The receiving device of the first environment of the computing system is further configured to receive a cryptogram from the third environment of the computing system, wherein the third environment of the computing system is configured to generate the cryptogram using at least the account profile and the session key or the secondary key. The transmitting device of the first environment of the computing system is further configured to transmit a data signal superimposed with credential data to the external computing device, wherein the credential data includes at least the cryptogram and the transaction identifier and wherein the data signal is transmitted via the secure communication protocol.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks, also referred to herein as transaction processing networks, may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" or "transaction processing network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant. In some instances, as used herein, the term "merchant" may refer to an apparatus or device of a merchant entity.

System for Generation of Cryptograms in a Webservice Environment

Figure 1:
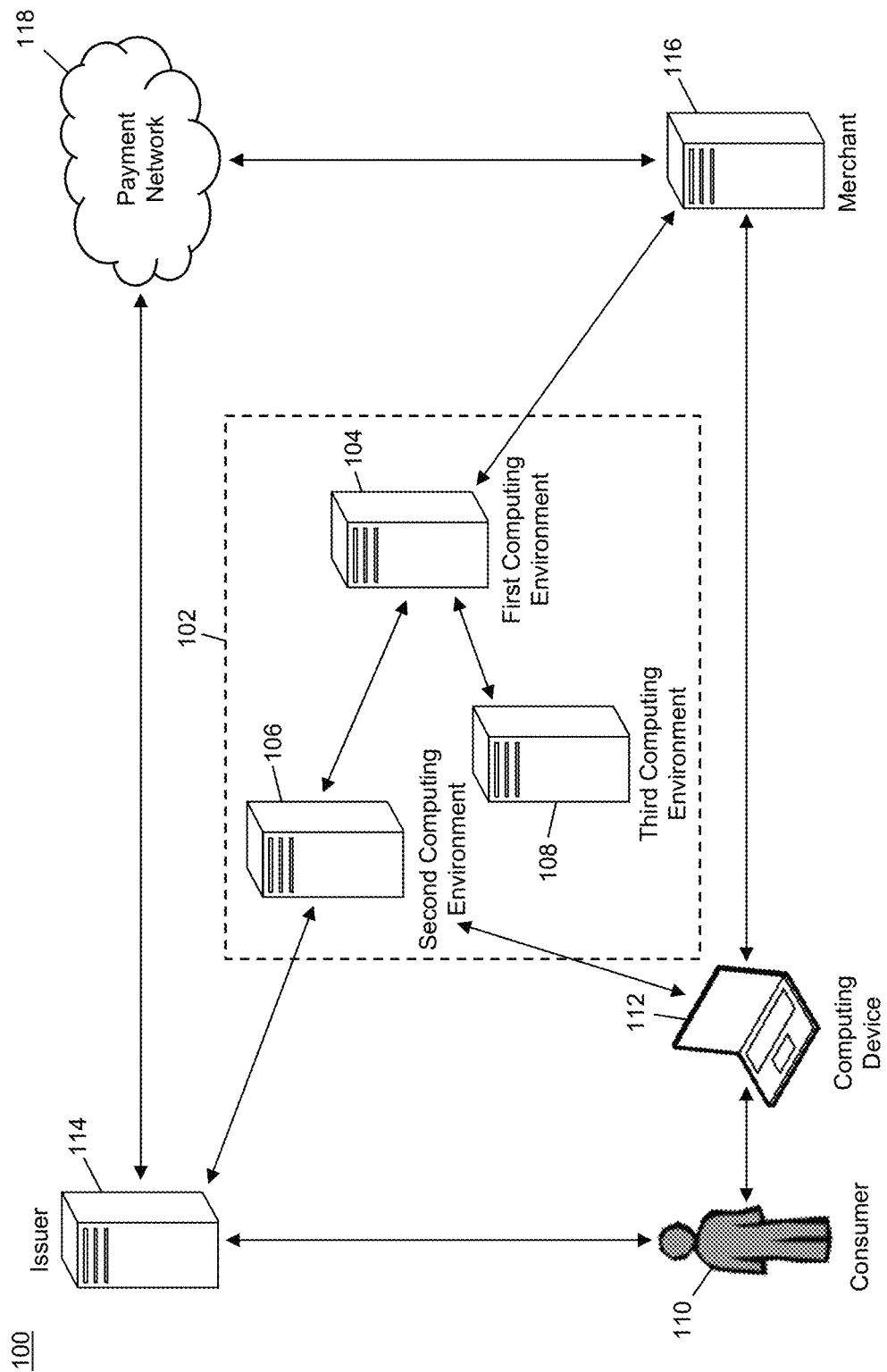
FIG. 1 is a block diagram illustrating a high level system architecture for generating and conveying cryptograms corresponding to a transaction account in an electronic payment transaction conducted in a webservice environment in accordance with exemplary embodiments.

FIG. 1 illustrates a system 100 for the generation and conveyance of cryptograms using an external computing system 102 in a webservice environment for use in electronic payment transactions.

The computing system 102 may be include multiple computing environments, illustrated in FIG. 1 as first computing environment 104, second computing environment 106, and third computing environment 108. The computing environments, discussed in more detail below, may be configured to perform various functions related to the identification of transaction account data and generation of payment cryptograms based thereon for use in electronic payment transactions conducted in a webservice environment. The computing system 102 may comprise a single computing device configured to perform the functions of each of the computing environments included therein, may include a separate computing device for each computing environment, or a combination thereof using a suitable system architecture that will be apparent to persons having skill in the relevant art. In some embodiments, the computing environments included in the computing device 102 may be separate such that one computing environment (e.g., the third computing environment 108) may not be able to directly access data stored in or otherwise accessible by a different computing environment (e.g., the second computing environment 106) in the computing system 102.

In the system 100, a consumer 110 may utilize a computing device 112 in order to conduct payment transactions in a webservice environment, where the computing system 102 may be used to convey payment information, including a payment cryptogram, for use in the electronic payment transaction. The computing device 112 may be any type of computing device suitable for performing the functions discussed herein, such as a desktop computer, laptop computer, notebook computer, tablet computer, cellular phone, smart phone, smart watch, smart television, wearable computing device, implantable computing device, etc.

The system 100 may include an issuer 114. The issuer 114 may be a financial institution, such as an issuing bank, configured to issue a transaction account to the consumer 110 for use in funding payment transactions, such as a credit card account. To utilize the computing system 102 in electronic payment transactions, the consumer 110 may first register their transaction account with the computing system 102. In some embodiments, the consumer 110 may directly communicate with the computing system 102 using the computing device 112. For example, the consumer 110 may input payment information into the computing device 112, which may electronically transmit the payment information to a computing environment of the computing system 102, such as the second computing environment 106, using a suitable communication network, such as a local area network, a wireless area network, a radio frequency network, or the Internet. In some instances, the computing device 112 and second computing environment 106 may electronically communicate using a secure communication protocol, such as an encrypted hypertext transfer protocol (HTTPS). In other embodiments, the consumer 110 may communicate with the issuer 114 using the computing device 112 and instruct the issuer 114 to provide payment information to the computing system 102. In such an embodiment, the consumer 110 may input instructions into the computing device 112, which may be electronically transmitted to the issuer 114, which may in turn identify payment information for the indicated transaction account and may electronically transmit the payment information to the second computing environment 106.

The second computing environment 106 may receive the payment information, which may be stored by the second computing environment 106, such as in local storage or in secure external storage remotely accessible by the second computing environment 106. In some instances, the second computing environment 106 may communicate with the issuer 114 using a suitable communication method to verify the payment information and/or the consumer's authorization to utilize the payment information, as well as to obtain any additional information suitable for use in performing the functions discussed herein. For example, the issuer 114 may issue a payment token or separate account number to the second computing environment 106 for use with the transaction account. In some embodiments, external communication with the issuer 114 and/or computing device 112 may be performed by the first computing environment 104, with received information being conveyed to the second computing environment 106 for storage. In such embodiments, the first computing environment 104 may destroy any data received in the registration of the transaction account for use. In such an instance, the transaction account may be registered with the payment information stored in the second computing environment 106, which may be inaccessible via external communication with the computing system 102, which may provide for additional security as to the stored payment information.

Once the transaction account has been registered with the computing system 102, the consumer 110 may initiate a payment transaction with a merchant 116 using the computing device 112. For example, the consumer 110 may use the computing device 112 to navigate to a website associated with the merchant 116 and initiate a payment transaction thereby, or may execute an application program associated with the merchant 116 suitable for initiation of a payment transaction involving the merchant 116. Other methods for initiating a payment transaction with a merchant 116 using a computing device 112 in a webservice environment will be apparent to persons having skill in the relevant art.

As part of the initiation of the payment transaction, the consumer 110 may indicate to the merchant 116, using the computing device 112, that the payment information is to be provided by the computing system 102. For example, the merchant 116 webpage or application program may include a button or other element to indicate that the payment information is to be provided by the computing system 102. The computing system of the merchant 116 may then electronically transmit a data signal to the first computing environment 104 of the computing system 102 that is superimposed with a request for payment credentials. The data signal may be electronically transmitted via a secure communication protocol, such as the HTTPS protocol transmitted via the Internet. The request for payment credentials may include at least an account identifier associate with the transaction account indicated for use by the consumer 110. The account identifier may be, for example, a username, password, e-mail address, phone number, identification number, combination thereof, or other data suitable for use in identification and/or authentication of a transaction account for use. For example, the consumer 110 may provide, via the computing device 112, a username and password for authentication by the computing system 102, as well as an identification number or other indicator for identifying the transaction account to be used for payment, such as in instances where the consumer 110 may have multiple transaction accounts registered.

The request for payment credentials may also include data suitable for use in the generation of a payment cryptogram for the electronic payment transaction. For example, the request may include a transaction identifier, which may be a value associated with the payment transaction that may be used for validation of the data returned by the computing system 102. The transaction identifier may include, for example, an unpredictable number generated by the merchant 116 computing system.

The first computing environment 104 may receive the request for payment credentials, and may transmit the account identifier and any other associated data to the second computing environment 106 using a suitable internal communication method. The second computing environment 106 may receive the data from the first computing environment 104 and may identify an account profile associated with the indicated transaction account. The account profile may include a transaction account number and any other additional data suitable for use in generating a payment cryptogram and the processing of a payment transaction, such as a transaction counter, expiration date, security code, name, zip code or postal code, billing address, etc. The second computing environment 106 may electronically transmit the card profile to the first computing environment 104 using a suitable internal communication method.

The first computing environment 104 may receive the card profile, and may then request a session key from the second computing environment 106. The session key may be a cryptographic key associated with the card profile that is identified by the second computing environment 106. In some instances, the session key may be generated by the second computing environment 106. In other instances, the session key may be previously generated by the second computing environment 106 or otherwise obtained by the second computing environment 106, such as from the associated issuer 114. In some instances, the session key may be shared with the issuer 114 or generated using a process that is known by the issuer 114, such that the issuer 114 and second computing environment 106 may possess corresponding session keys. The second computing environment 106 may electronically transmit the session key to the first computing environment 104. In some embodiments, the session key may be electronically transmitted with the account profile (e.g., in a single transmission from the second computing environment 106 to the first computing environment 104).

In some embodiments, the first computing environment 104 may be configured to validate the account profile and/or session key. In such embodiments, the first computing environment 104 and second computing environment 106 may store corresponding application keys. Each computing environment may be configured to derive application session keys based on the application key using suitable methods that will be apparent to persons having skill in the relevant art. The application session keys may be derived, for example, using the application key and the card profile and/or session key using a predetermined algorithm. The first computing environment 104 may be configured to validate the account profile and session key provided by the second computing environment 106 using the derived application session key, using methods that will be apparent to persons having skill in the relevant art. In some embodiments, the second computing environment 106 may encrypt the account profile and/or session key using the derived application session key. In such embodiments, validation of the account profile and/or session key may include the decryption of the account profile and/or session key using the derived application session key.

Once the account profile and session key have been validated and/or decrypted, the first computing environment 104 may electronically transmit a cryptogram request to the third computing environment 108 in the computing system 102. In some embodiments, the third computing environment 108 may be configured to perform the functions of an electronic wallet application program. In such embodiments, the third computing environment 108 may be configured to operate as a proxy for the electronic wallet application program, and may be configured to execute multiple instances of an electronic wallet application program, such as a separate instance for each payment cryptogram to be generated. In such instances, the third computing environment 108 may concurrently operate to generate payment cryptograms for multiple transaction accounts and electronic payment transactions. The cryptogram request may include at least the account profile and the session key. In some instances, the cryptogram request may include a secondary key derived from the session key, such as the application session key.

The third computing environment 108 may generate a payment cryptogram for the electronic payment transaction using at least data included in the account profile and the key provided by the first computing environment 105. The third computing environment 108 may generate the payment cryptogram using one or more predetermined algorithms configured for the generation thereby, based on application thereof to data included in the account profile and the session key or secondary key. For example, the third computing environment 108 may use a hashing algorithm to generate a hash using the session key and a transaction counter included in the account profile. In some embodiments, the cryptogram request may also include the unpredictable number provided by the merchant 116 computing system, which may also be used in the generation of the cryptogram. In some instances, the cryptogram may be generated using an algorithm identified based on additional information included in the request for payment credentials and/or account profile. For example, the merchant 116 computing system may request a specific type of cryptogram, which may be indicated in the cryptogram request, and a corresponding algorithm identified and used by the third computing environment 108.

Once the cryptogram has been generated, the third computing environment 108 may electronically transmit the cryptogram to the first computing environment 104 using a suitable internal communication method. The first computing environment 104 may generate a data message that includes the generated cryptogram, the transaction identifier (e.g., unpredictable number and other associated data), and other payment credentials (e.g., included in the account profile), and may electronically transmit a data signal superimposed with the data message back to the merchant 116 computing system using the secure communication protocol. The computing system of the merchant 116 may then process the payment transaction using the payment credentials using traditional methods and systems.

The methods and systems discussed herein provide for the generation of a payment cryptogram for use in an electronic payment transaction by the computing system 102, which includes a plurality of separated computing environments. By utilizing multiple computing environments, data may be quarantined in such a way that if data associated with one computing environment were to be compromised, it would be insufficient for use in payment transactions, thus provided for additional security to consumer transaction accounts. The methods discussed herein also enable the providing of payment cryptograms for use in a payment transaction in a webservice environment where the consumer 110 does not need to provide their payment information and where the computing device 112 does not electronically transmit sensitive financial information to the merchant 116. This may provide for greater security and peace of mind to consumers 110, and may reduce the risk of fraud in conducting payment transactions in a webservice environment. In addition, the methods and systems discussed herein may enable consumers 110 to conduct payment transactions in a webservice environment using legacy computing devices 112 without the need for specialized secured storage and application programs that may be unavailable in legacy computing devices, due to not requiring the use of an electronic wallet on the computing device 112.

Computing Environments

Figure 2:
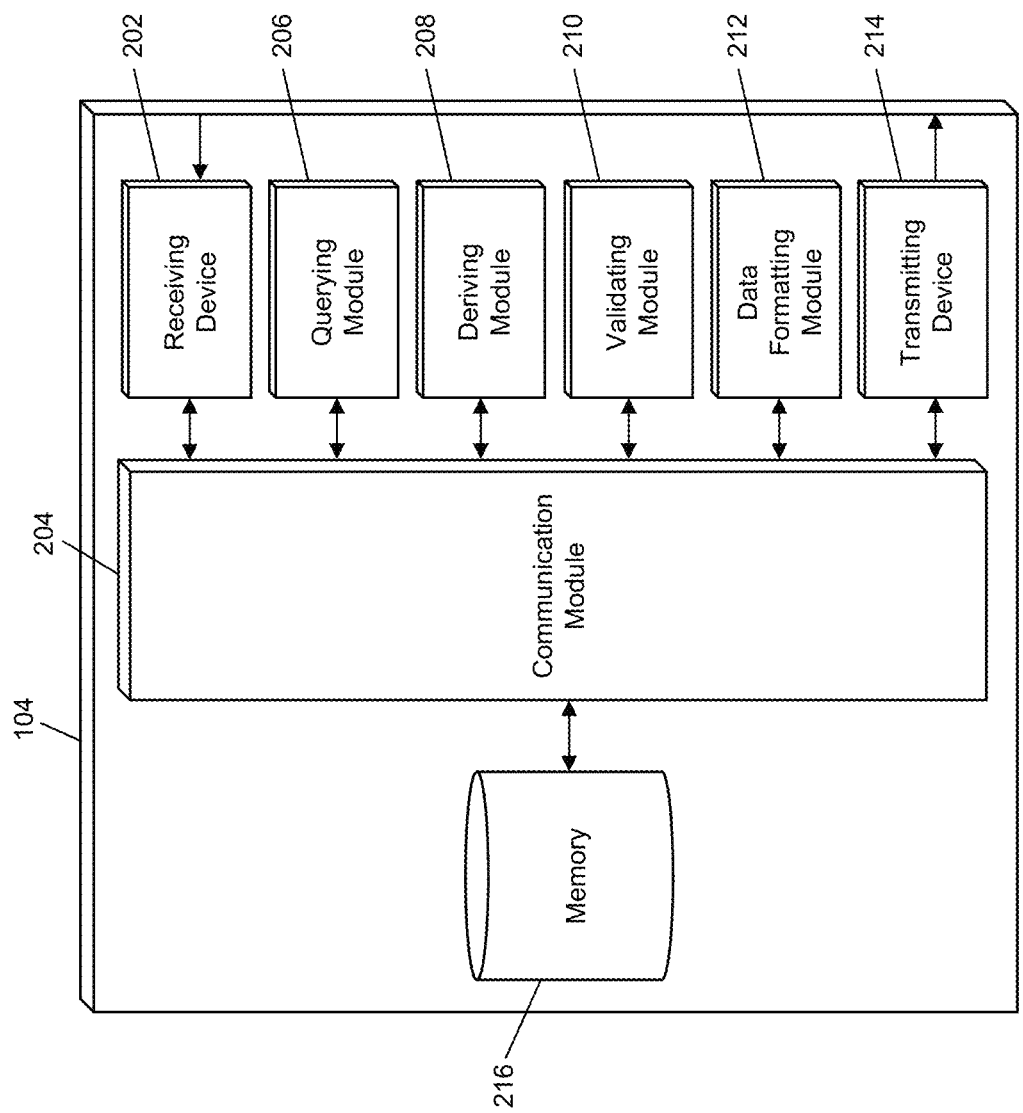
FIG. 2 is a block diagram illustrating the first computing environment of FIG. 1 for the requesting and conveying of cryptograms for use in transactions conducted in a webservice environment in accordance with exemplary embodiments.

FIG. 2 illustrates an embodiment of the first computing environment 104 of the computing system 102 of the system 100. It will be apparent to persons having skill in the relevant art that the embodiment of the first computing environment 104 illustrated in FIG. 2 is provided as illustration only and may not be exhaustive to all possible configurations of the first computing environment 104 suitable for performing the functions as discussed herein. For example, the computer system 600 illustrated in FIG. 6 and discussed in more detail below may be a suitable configuration of the first computing environment 104. In addition, other computing environments (e.g., the second computing environment 106 and third computing environment 108) may utilize a similar configuration to that of the first computing environment 104 illustrated in FIG. 2 and discussed below. In such instances, functions of the other computing environments in the computing system 102 may be discussed herein as being performed by the elements of the first computing environment 104 illustrated in FIG. 2 and discussed below.

The first computing environment 104 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 118 for the transmission of transaction messages that include sensitive financial data and information. In some instances, the receiving device 202 may also be configured to receive data from the second computing environment 106, the third computing environment 108, computing devices 112, issuers 114, merchants 116, payment networks 118, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein. In some embodiments, the receiving device 202 of a computing environment of the computing system 102, such as those of the second computing environment 106 and third computing environment 108 may be configured to receive only data signals electronically transmitted by other computing environments in the computing system 102.

The receiving device 202 of the first computing environment 104 may be configured to receive data signals from the computing systems of merchants 116 that are superimposed with requests for payment credentials. The data signals electronically transmitted by the merchant 116 computing systems may be transmitted via a secure communication protocol in a webservice environment, such as the HTTPS protocol. Payment credential requests may include transaction identifiers and account identifiers, which may be used in the identification of transaction accounts and generation of payment cryptograms based thereon. Transaction identifiers may include, for example, unpredictable numbers. Account identifiers may include, for example, usernames, passwords, e-mail addresses, telephone numbers, etc. The receiving device 202 may also be configured to receive data signals electronically transmitted by issuers 114 and computing devices 112, such as transmitted during the registration of a transaction account for use in an electronic payment transaction. Such data signals may include, for example, transaction account numbers and other associated data, authentication data, algorithms, etc. Transmissions from issuers 114 and computing devices 112 may utilize any suitable communication network, method, and protocol, such as a secure communication protocol such as the HTTPS protocol.

The first computing environment 104 may also include a communication module 204. The communication module 204 may be configured to transmit data between modules, engines, databases, memories, and other components of the first computing environment 104 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the first computing environment 104 and external components of the first computing environment 104, such as externally connected databases, display devices, input devices, etc. The first computing environment 104 may also include a processing device. The processing device may be configured to perform the functions of the first computing environment 104 discussed herein as will be apparent to persons having skill in the relevant art. In some embodiments, the processing device may include and/or be comprised of a plurality of engines and/or modules specially configured to perform one or more functions of the processing device, such as a querying module 206, deriving module 208, validating module 210, data formatting module 212, etc. As used herein, the term "module" may be software or hardware particularly programmed to receive an input, perform one or more processes using the input, and provide an output. The input, output, and processes performed by various modules will be apparent to one skilled in the art based upon the present disclosure.

In some embodiments, the first computing environment 104 may include a querying module 206. The querying module 206 may be configured to execute queries on databases to identify information. The querying module 206 may receive one or more data values or query strings, and may execute a query string based thereon on an indicated database to identify information stored therein. The querying module may then output the identified information to an appropriate engine or module of the first computing environment 104 as necessary. The querying module may, for example, execute a query on internal memory 216 to identify an application key for use in deriving an application session key. In other computing environments of the computing system 102, such as the second computing environment 106, a querying module 206 may execute queries on local databases to identify information suitable for performing the functions discussed herein. For example, a querying module 206 in the second computing environment 106 may execute a query on a database to identify an account profile and session key corresponding to an account identifier provided by the first computing environment 104.

The first computing environment 104 may also include a deriving module 208. The deriving module 208 may be configured to receive an application key as input and may, using one or more suitable algorithms, derive an application session key based on the application key. The deriving module 208 may output the derived application session key to another module or engine of the first computing environment 104 for use thereof, such as by providing the application session key to the validating module 210 for use as discussed below. In some embodiments, the deriving module 208 may be configured to receive additional data as input for use in deriving an application session key, such as the session key provided by the second computing environment 106 or the account profile.

The validating module 210 of the first computing environment 104 may be configured to validate data received by the receiving device 202. The validating module 210 may be configured to receive data to be validated as input, may receive and/or identify additional data to be used in the validation, may perform the validation, and may output a result of the validation. For example, the validating module 210 may receive an account profile and session key (e.g., from the second computing environment 106) to be validated, and may, using the application session key derived by the deriving module 208, validate the account profile and session key using the application session key. The validating module 210 may output the response of the validation to another engine or module of the first computing environment 104, such as an output indicating that the account profile and session key are valid for use in an electronic payment transaction.

The first computing environment 104 may also include a transmitting device 214 may be configured to transmit data over one or more networks via one or more network protocols. In some embodiments, the transmitting device 214 may be configured to transmit data over the payment rails, such as using specially configured infrastructure associated with payment networks 118 for the transmission of transaction messages that include sensitive financial data and information, such as identified payment credentials. In some instances, the transmitting device 214 may be configured to transmit data to the second computing environment 106, the third computing environment 108, computing devices 112, issuers 114, merchants 116, payment networks 118, and other entities via alternative networks, such as the Internet. In some embodiments, the transmitting device 214 may be comprised of multiple devices, such as different transmitting devices for transmitting data over different networks, such as a first transmitting device for transmitting data over the payment rails and a second transmitting device for transmitting data over the Internet. The transmitting device 214 may electronically transmit data signals that have data superimposed that may be parsed by a receiving computing device. In some instances, the transmitting device 214 may include one or more modules for superimposing, encoding, or otherwise formatting data into data signals suitable for transmission.

The transmitting device 214 may be configured to electronically transmit data signals to other computing environments in the computing system 102. The data signals may be superimposed with data suitable for use in performing the functions discussed herein, such as requests for account profiles and session keys to the second computing environment 106 and requests for cryptograms to the third computing environment 108. The transmitting device 214 may also be configured to electronically transmit data signals to external computing systems, such as to the issuer 114 requesting payment credentials for registration of a transaction account and to the merchant 116 for providing a payment cryptogram generated by the third computing environment 108.

In some embodiments, the first computing environment 104 may include a data formatting module 212. The data formatting module 212 may be configured to reformat data for use in performing the functions discussed herein. The data formatting module 212 may receive data for reformatting and one or more criteria for the reformat as input, may reformat the data accordingly, and may output the reformatting data. For example, the data formatting module 212 may receive transaction data from the receiving device 202 that is received from the merchant 116 for use in generating a cryptogram. The data provided by the merchant 116 may be in a format not suitable for use by the third computing environment 108 in generating the requested cryptogram. The data formatting module 212 may reformat the transaction data using rules and/or algorithms to convert the data into a format suitable for use by the third computing environment 108. The reformatted data may then be output into a suitable engine or module, such as the transmitting device 214 for transmitting to the third computing environment 108.

The first computing environment 104 may also include a memory 216. The memory 216 may be configured to store data for use by the first computing environment 104 in performing the functions discussed herein. The memory 216 may be configured to store data using suitable data formatting methods and schema and may be any suitable type of memory, such as read-only memory, random access memory, etc. The memory 216 may include, for example, encryption keys and algorithms, communication protocols and standards, data formatting standards and protocols, program code for modules and application programs of the processing device, and other data that may be suitable for use by the first computing environment 104 in the performance of the functions disclosed herein as will be apparent to persons having skill in the relevant art.

In some embodiments, a computing environment may include additional engines or modules suitable for performing the functions discussed herein. For example, the third computing environment 108 may include a generation module configured to generate cryptograms. The generation module may receive data as input, may generate a cryptogram using one or more suitable algorithms as applied to the input data, and may output the generated cryptogram. The generation module may utilize, for example, account profile data (e.g., transaction counters), transaction identifiers (e.g., unpredictable numbers), and other data to generate a payment cryptogram to be used in the processing of an electronic payment transaction.

In another example, the second computing environment 106 may include an encryption module. The encryption module may be configured to receive data as input, encrypt the data, and then output the encrypted data. For instance, the second computing environment 106 may encrypt the account profile and/or session key derived using the application session key, and may electronically transmit (e.g., via a transmitting device 214) the encrypted account profile and/or session key to the first computing environment 104. In such embodiments, the first computing environment 104 may include a decryption module configured to decrypt the encrypted data using the application session key derived by the deriving module 208. Additional engines or modules may be included in one or more of the computing environments suitable for use in performing the functions discussed herein.

Process for Generating a Payment Cryptogram in a Webservice Environment

Figure 3A:
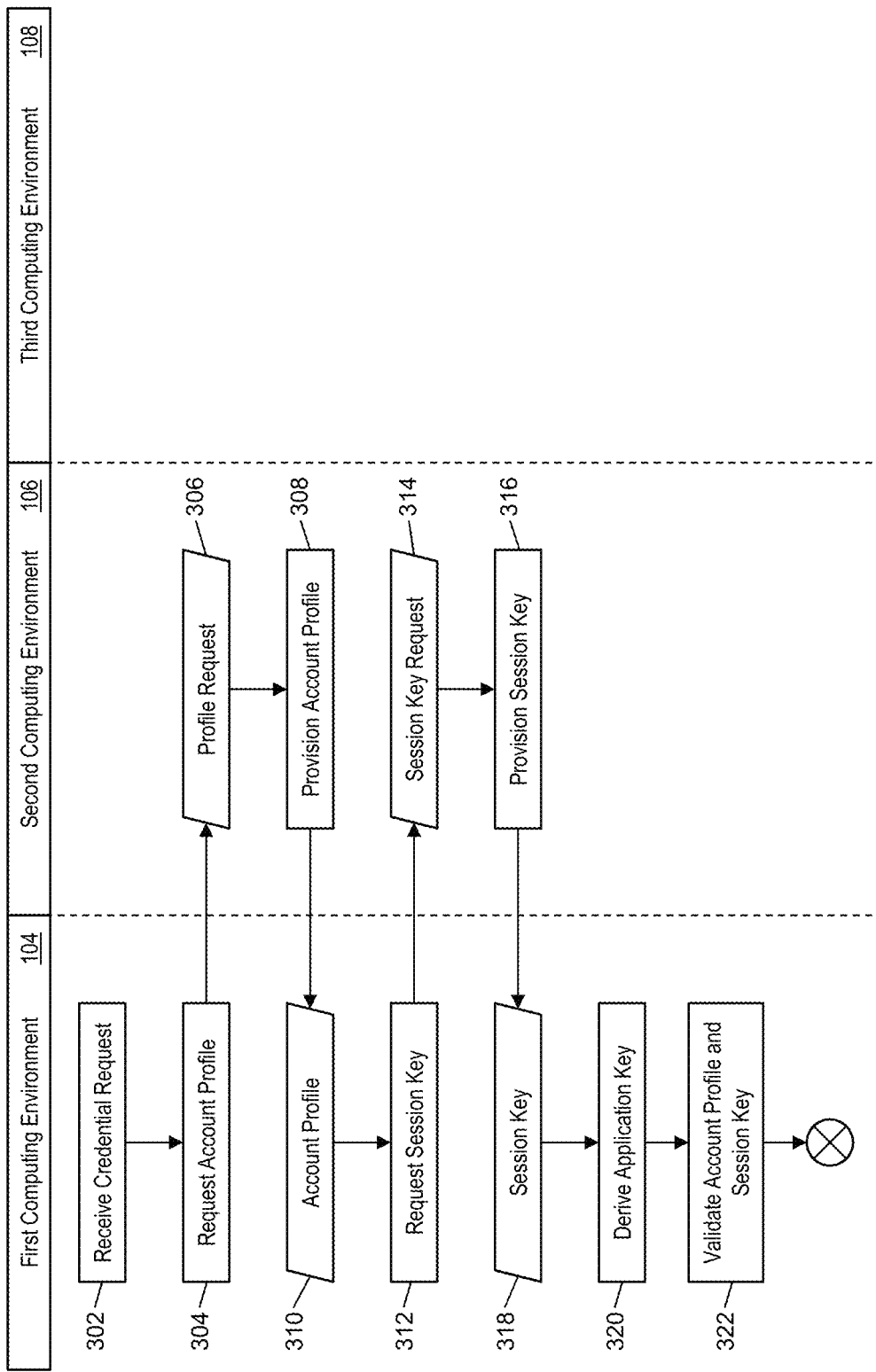
FIGS. 3A and 3B are a flow diagram illustrating a process for generation and conveyance of a cryptogram in an electronic payment transaction conducted in a webservice environment using the computing system of FIG. 1 in accordance with exemplary embodiments.
Figure 3B:
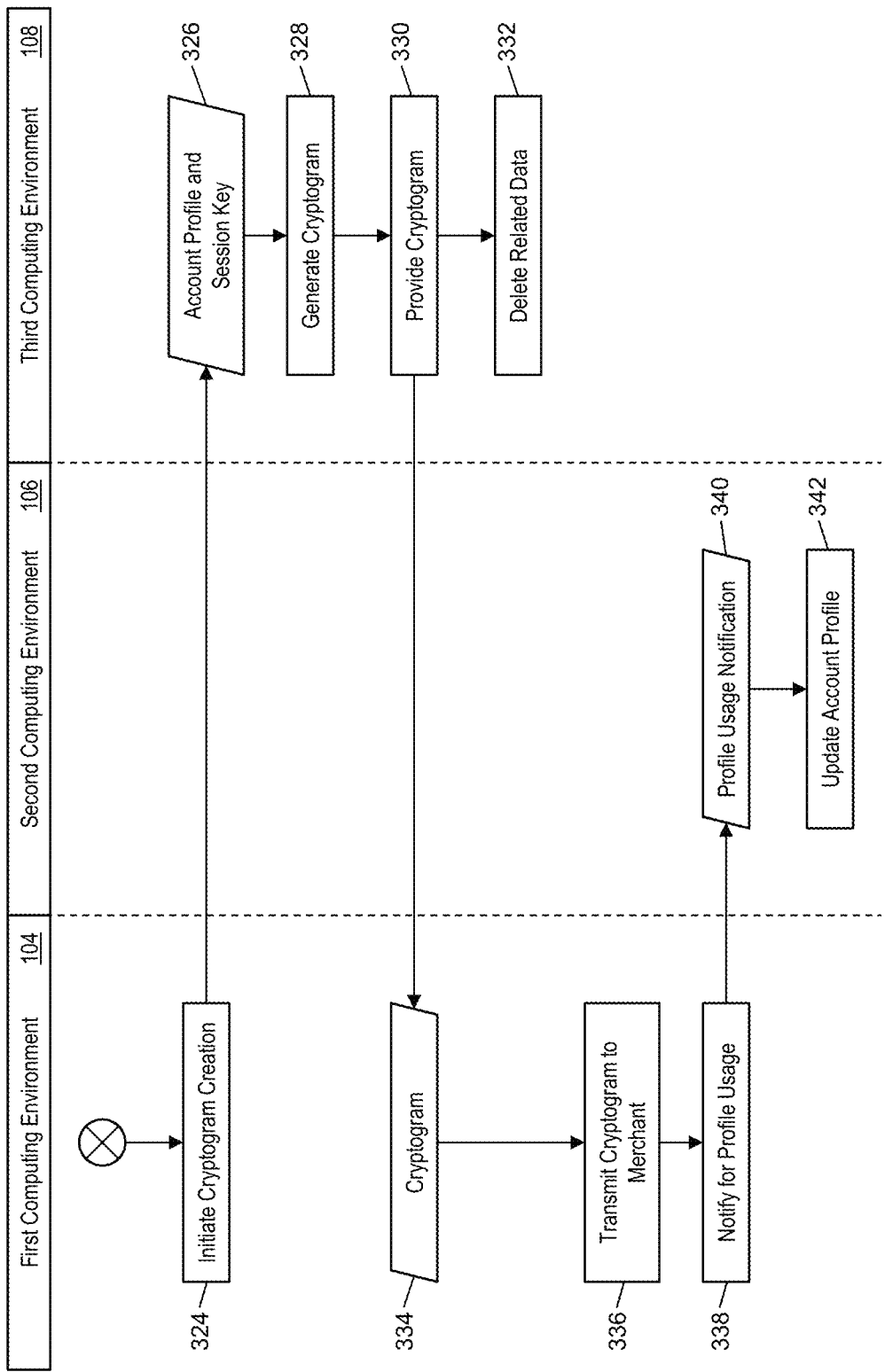

FIGS. 3A and 3B illustrate a process for the generation of a payment cryptogram in the computing system 102 for use in an electronic payment transaction conducted in a webservice environment.

In step 302, the receiving device 202 of the first computing environment 104 may receive a data signal from a merchant 116 computing system superimposed with a request for payment credentials. The data signal may be electronically transmitted using a secure communication protocol in a webservice environment, such as the HTTPS protocol. The request for payment credentials may include a transaction identifier, such as an unpredictable number, and other data suitable for use in the generation of a cryptogram, such as a requested cryptogram type, as well as an account identifier suitable for use in the identification of a transaction account.

In step 304, the transmitting device 214 of the first computing environment 104 may electronically transmit a request for an account profile to the second computing environment 106 in the computing system 102. The request may include at least the account identifier included in the request for payment credentials, and may be transmitted using a suitable internal communication method. In step 306, a receiving device 202 of the second computing environment 106 may receive the account profile request. In step 308, the second computing environment 106 may identify the account profile and may provision it to the first computing environment 104. Identification of the account profile may include the execution of a query, by a querying module 206 of the second computing environment 106, on a database (e.g., stored in a memory 216 of the second computing environment 106) to identify an account profile stored therein using the account identifier. A transmitting device 214 of the second computing environment 106 may electronically transmit the account profile to the first computing environment 104 to accomplish the provisioning.

In step 310, the receiving device 202 of the first computing environment 104 may receive the account profile. In step 312, the transmitting device 214 of the first computing environment 104 may electronically transmit a request for a session key to the second computing environment 106. The request for a session key may include the account identifier or other data associated with the account profile. In step 314, the receiving device 202 of the second computing environment 106 may receive the request for a session key.

In step 316, the second computing environment 106 may identify a session key associated with the account profile and may provision it to the first computing environment 104. The identification of the session key may include the execution of a query by the querying module 206 of the second computing environment 106 on a memory 216 of the second computing environment 106 to identify the session key associated with the account profile. The transmitting device 214 of the second computing environment 106 may electronically transmit the identified session key to the first computing environment 104. In step 318, the receiving device 202 of the first computing environment 104 may receive the session key.

In step 320, the deriving module 208 of the first computing environment 104 may derive an application session key. The application session key may be derived using a suitable algorithm as applied to at least an application key accessed by the first computing environment 104, such as may be stored in the memory 216 of the first computing environment 104 and identified via the querying module 206. In step 322, the validating module 210 of the first computing environment 104 may validate the account profile and session key received from the second computing environment 106 using the derived application session key.

In step 324, the transmitting device 214 of the first computing environment 104 may electronically transmit a cryptogram request to the third computing environment 108 to initiate the generation of a cryptogram for use in the electronic payment transaction. In step 326, a receiving device 202 of the third computing environment 108 may receive the cryptogram request, which may include the account profile, session key, and any other data suitable for use in generating the cryptogram, such as an unpredictable number provided by the merchant 116 computing system and included in the request for payment credentials. In step 328, a generation module of the third computing environment 108 may generate a cryptogram based on application of one or more algorithms to the provided data.

In step 330, a transmitting device 214 of the third computing environment 108 may electronically transmit the generated cryptogram to the first computing environment 104. In step 332, the third computing environment 108 may destroy all data related to the generation of the payment cryptogram, including the account profile, session key, the payment cryptogram, and any other additional data. In step 334, the receiving device 202 of the first computing environment 104 may receive the cryptogram from the third computing environment 108.

In step 336, the transmitting device 214 of the first computing environment 104 may electronically transmit the cryptogram and any other necessary data, such as the unpredictable number, payment credentials included in the account profile, etc. to the merchant 116 computing system via a secure communication protocol. In step 338, the transmitting device 214 of the first computing environment 104 may electronically transmit a notification to the second computing environment 106 to indicate that the account profile had been used in the electronic payment transaction. In step 340, the receiving device 202 of the second computing environment 106 may receive the notification, and, in step 342, may update (e.g., via execution of a query by the querying module 206 on the corresponding database) the account profile based on the notification, such as by increasing the transaction counter to account for the new transaction.

Exemplary Method for Generating Cryptograms in a Webservice Environment

Figure 4:
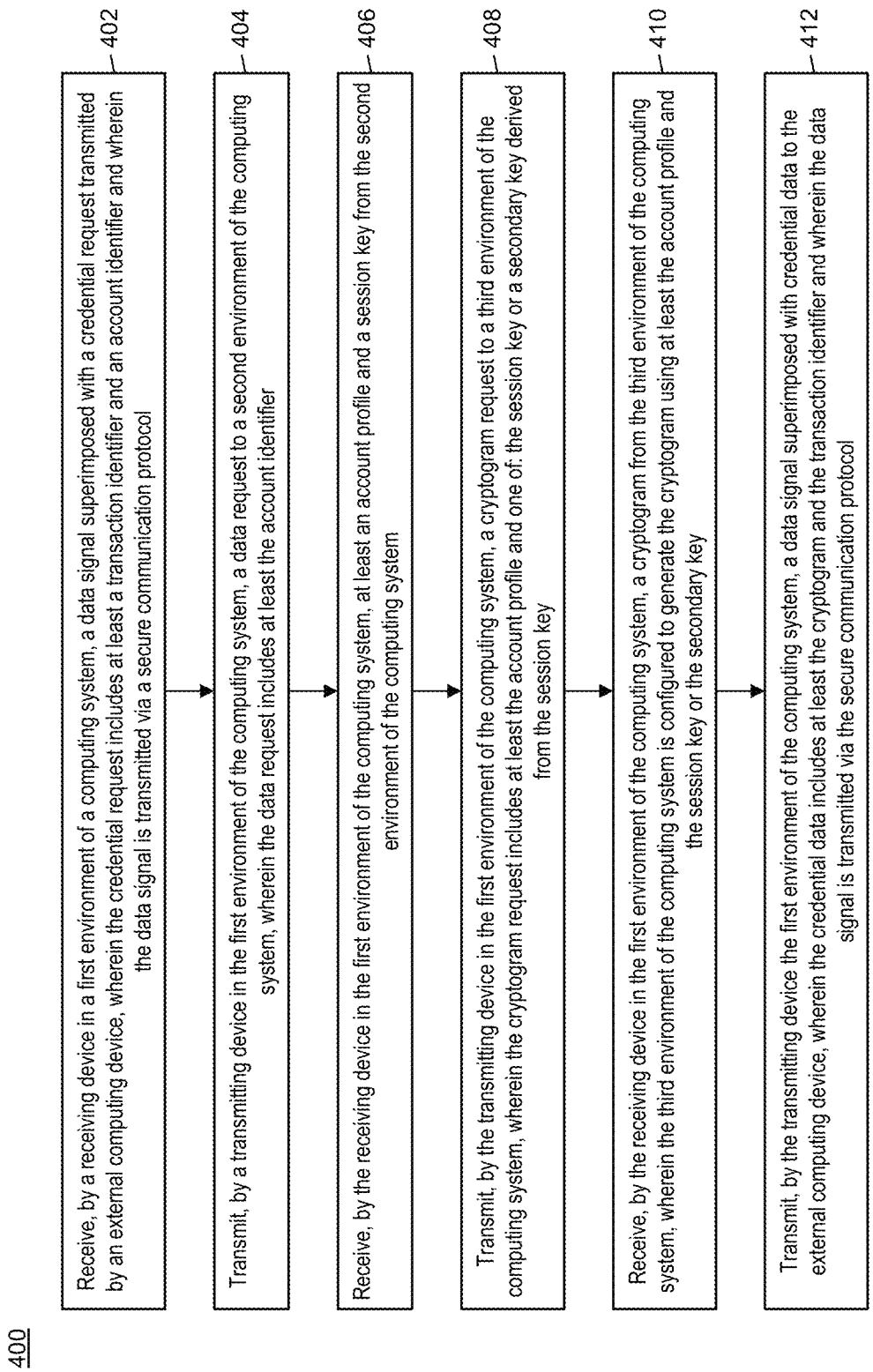
FIG. 4 is a flow chart illustrating an exemplary method for generating cryptograms in a webservice environment in accordance with exemplary embodiments.

FIG. 4 illustrates a method 400 for the generation and conveyance of cryptograms in a webservice environment using a secure communication protocol for use in an electronic payment transaction.

In step 402, a data signal superimposed with a credential request may be received by a receiving device (e.g., the receiving device 202) in a first environment (e.g., the first computing environment 104) of a computing system (e.g., the computing system 102), wherein the data signal is transmitted by an external computing device via a secure communication protocol, and where the credential request includes at least a transaction identifier and an account identifier. In step 404, a data request may be transmitted by a transmitting device (e.g., the transmitting device 214) in the first environment of the computing system to a second environment (e.g., the second computing environment 106) of the computing system, wherein the data request includes at least the account identifier.

In step 406, at least an account profile and a session key may be received by the receiving device in the first environment of the computing system from the second environment of the computing system. In step 408, a cryptogram request may be transmitted by the transmitting device in the first environment of the computing system to a third environment (e.g., the third computing environment 108) of the computing system, wherein the cryptogram request includes at least the account profile and one of: the session key or a secondary key derived from the session key.

In step 410, a cryptogram may be received by the receiving device of the first environment of the computing system from the third environment of the computing system, wherein the third environment of the computing system is configured to generate the cryptogram using at least the account profile and the session key or the secondary key. In step 412, a data signal superimposed with credential data may be transmitted by the transmitting device of the first environment of the computing system to the external computing device, wherein the credential data includes at least the cryptogram and the transaction identifier and where the data signal is transmitted via the secure communication protocol.

In one embodiment, the transaction identifier may be an unpredictable number generated by the external computing device. In some embodiments, receiving the account profile and session key from the second environment of the computing system may comprise: receiving, by the first environment of the computing system, the account profile from the second environment of the computing system in response to the transmitted data request; transmitting, by the first environment of the computing system, a second data request to the second environment of the computing system; and receiving, by the first environment of the computing system, the session key from the second environment of the computing system in response to the transmitted second data request.

In one embodiment, the method 400 may further include: accessing, by a querying module (e.g., the querying module 206) of the first environment of the computing system, a set of application keys; deriving, by a deriving module (e.g., the deriving module 208) of the first environment of the computing system, an application session key based on application of one or more algorithms to the accessed set of application keys; and validating, by a validating module (e.g., the validating module 210) of the first environment of the computing system, the received account profile and session key using the derived application session key. In a further embodiment, the set of application keys may be stored in a memory (e.g., the memory 216) of the first environment of the computing system. In another further embodiment, the set of application keys may be stored in a memory of the second environment of the computing system.

In some embodiments, the credential request may further include transaction data. In further embodiments, the method 400 may also include converting, by the first environment of the computing device, the transaction data into modified transaction data based on one or more data transformation rules, wherein the cryptogram request further includes the modified transaction data, and the cryptogram is further generated using the modified transaction data. In an even further embodiment, the modified transaction data may indicate a format of the cryptogram. In one embodiment, the third environment of the computing device may be configured to destroy the account profile and session key or secondary key after generation of the cryptogram.

Payment Transaction Processing System and Process

Figure 5:
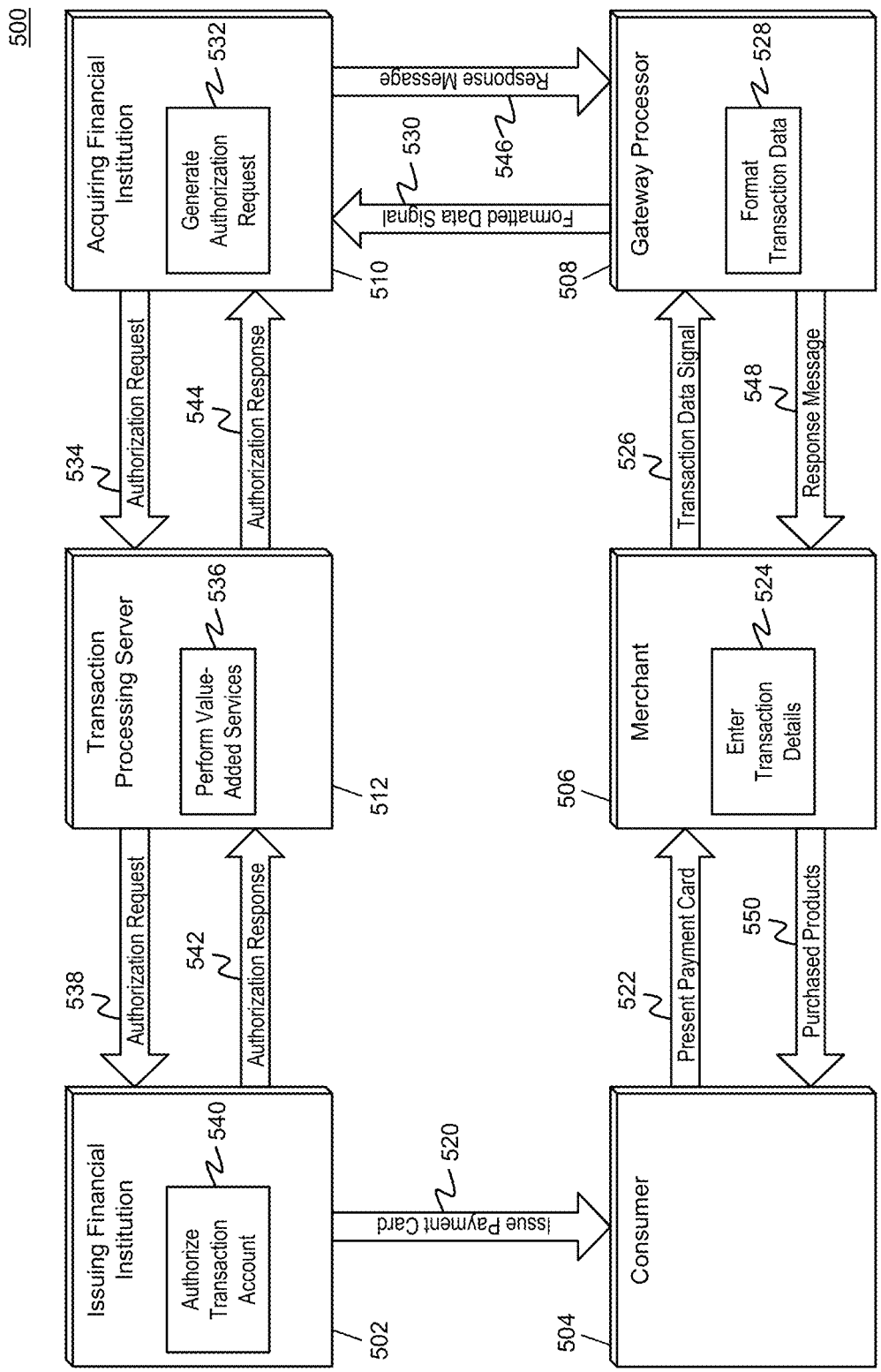
FIG. 5 is a flow diagram illustrating the processing of a payment transaction in accordance with exemplary embodiments.

FIG. 5 illustrates a transaction processing system and a process 500 for the processing of payment transactions in the system. The process 500 and steps included therein may be performed by one or more components of the system 100 discussed above, such as the merchant 116, payment network 118, issuer 114, consumer 110, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3A, 3B, and 4 discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
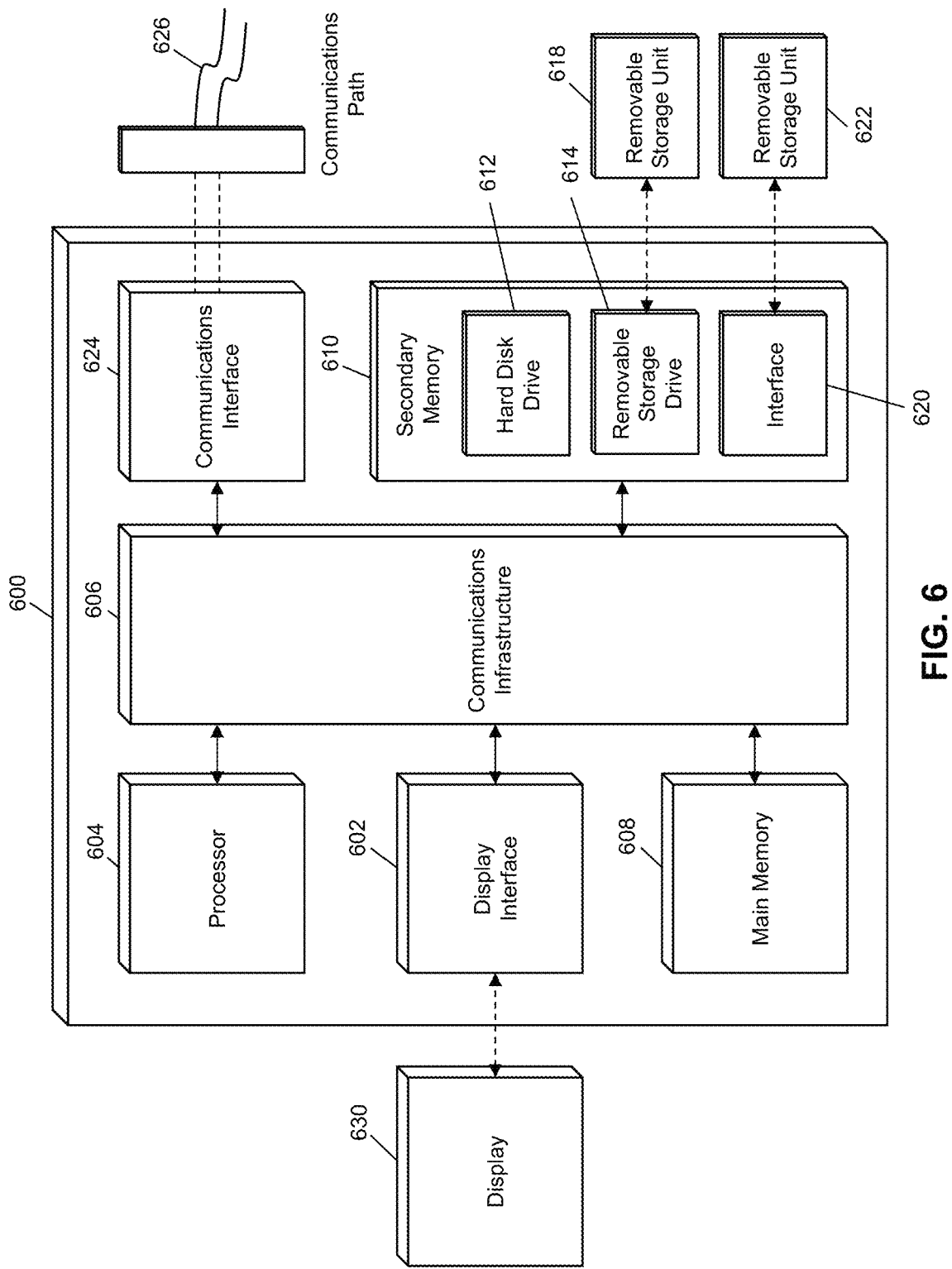
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the first computing environment 104, second computing environment 106, and third computing environment 108 of the computing system 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4, and 5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3A, 3B, 4 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for generating cryptograms in a webservice environment. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating cryptograms in a web service environment, comprising:
   receiving, by a receiving device of a first computing device of a computing system, from a transmitting device of a merchant computing device external to the computing system and via a secure communication protocol, a first data signal comprising a credential request;
   identifying, by the first computing device, a transaction identifier and an account identifier included in the credential request;
   in response to receiving the credential request comprising the account identifier, transmitting, by a transmitting device of the first computing device of the computing system and to a receiving device of a second computing device of the computing system, a data request that includes at least the account identifier;
   forwarding, by the receiving device of the second computing device to a communication module of the second computing device, the data request;
   forwarding, by the communication module of the second computing device and to a querying module of the second computing device, the data request;
   identifying, by the querying module of the second computing device of the computing system, an account profile using the account identifier and a session key associated with the account profile;
   forwarding, by the querying module of the second computing device and to the communication module of the second computing device, the account profile and the session key;
   forwarding, by the communication module of the second computing device and to the transmitting device of the second computing device, the account profile and the session key;
   receiving, by the receiving device of the first computing device of the computing system and from the transmitting device of the second computing device of the computing system, at least the account profile and the session key;
   forwarding, by the receiving device of the first communication device and to a communication module of the first computing device, the account profile and the session key;
   forwarding, by the communication module of the first computing device and to the transmitting device of the first computing device, the account profile and one of: the session key or a secondary key derived from the session key;

transmitting, by the transmitting device of the first computing device of the computing system and to a receiving device of a third computing device of the computing system, a cryptogram request that includes at least the account profile and one of: the session key or the secondary key derived from the session key;

forwarding, by the receiving device of the third computing device and to a communication module of the third computing system, the account profile and one of the session key or the secondary key;

forwarding, by the communication module of the third computing device and to a generation module of the third computing device, the account profile and one of the session key or the secondary key;

generating, by the generation module of the third computing device of the computing system, a cryptogram using at least the account profile and one of the session key or the secondary key;

forwarding, by the generation module of the third computing device and to the communication module of the third computing device, the cryptogram;

forwarding, by the communication module of the third computing device and to a transmitting device of the third computing device, the cryptogram;

receiving, by the receiving device of a first computing device of the computing system and from the transmitting device of the third computing device of the computing system, the cryptogram;

associating, by the first computing device of the computing system, the cryptogram with the transaction identifier by generating a data message including the cryptogram and the transaction identifier; and transmitting, by the transmitting device of the first computing device of the computing system, to the merchant computing device external to the computing system and via the secure communication protocol, a second data signal comprising the data message.

2. The method of claim 1, further comprising generating, by the merchant computing device external to the computing system, the transaction identifier, wherein the transaction identifier is an unpredictable number.

3. The method of claim 1, wherein receiving the account profile and session key from the second computing device of the computing system comprises:

receiving, by the first computing device of the computing system, the account profile from the second computing device of the computing system in response to the transmitted data request;

transmitting, by the first computing device of the computing system, a second data request to the second computing device of the computing system; and receiving, by the first computing device of the computing system, the session key from the second computing device of the computing system in response to the transmitted second data request.

4. The method of claim 1, further comprising:

accessing, by the first computing device of the computing system, a set of application keys;

deriving, by the first computing device of the computing system, an application session key based on application of one or more algorithms to the accessed set of application keys; and validating, by the first computing device of the computing system, the received account profile and session key using the derived application session key.

5. The method of claim 4, further comprising storing the set of application keys in a memory of the first computing device of the computing system.

6. The method of claim 4, further comprising storing the set of application keys in a memory of the second computing device of the computing system.

7. The method of claim 1, wherein the credential request further includes transaction data.

8. The method of claim 7, further comprising modifying, by the first computing device of the computing device, the transaction data into modified transaction data, wherein the cryptogram request further includes the modified transaction data, and the cryptogram is further generated using the modified transaction data.

* * * * *